United States Patent
Reuzel

(10) Patent No.: US 8,886,568 B2
(45) Date of Patent: Nov. 11, 2014

(54) LICENSE SPECIFIC AUTHORIZED DOMAINS

(75) Inventor: Johan Gerard Herman Reuzel, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1143 days.

(21) Appl. No.: 12/444,736

(22) PCT Filed: Oct. 10, 2007

(86) PCT No.: PCT/IB2007/054120
§ 371 (c)(1),
(2), (4) Date: Apr. 8, 2009

(87) PCT Pub. No.: WO2008/044210
PCT Pub. Date: Apr. 17, 2008

(65) Prior Publication Data
US 2010/0024039 A1  Jan. 28, 2010

(30) Foreign Application Priority Data
Oct. 12, 2006 (EP) .................................. 06122191

(51) Int. Cl.
*G06Q 99/00* (2006.01)
*H04L 29/06* (2006.01)
*G06F 21/10* (2013.01)

(52) U.S. Cl.
CPC ............ *H04L 63/10* (2013.01); *G06Q 2220/18* (2013.01); *G06Q 2220/12* (2013.01); *G06F 21/10* (2013.01); *H04L 2463/101* (2013.01)
USPC .................................. 705/59; 705/51; 726/26

(58) Field of Classification Search
USPC ........................................ 705/51, 59; 726/26
See application file for complete search history.

(56) References Cited

U.S. PATENT DOCUMENTS

| | | | |
|---|---|---|---|
| 2003/0236820 A1* | 12/2003 | Tierney et al. | 709/203 |
| 2004/0255147 A1 | 12/2004 | Peled et al. | |
| 2005/0210261 A1 | 9/2005 | Kamperman et al. | |
| 2006/0021065 A1 | 1/2006 | Kamperman et al. | |
| 2006/0190621 A1* | 8/2006 | Kamperman et al. | 709/245 |
| 2008/0195548 A1* | 8/2008 | Chu et al. | 705/59 |
| 2008/0244706 A1* | 10/2008 | Lenoir et al. | 726/4 |
| 2008/0313264 A1* | 12/2008 | Pestoni | 709/202 |
| 2011/0191859 A1* | 8/2011 | Naslund et al. | 726/27 |

FOREIGN PATENT DOCUMENTS

| | | |
|---|---|---|
| EP | 1564621 A1 | 8/2005 |
| WO | 2004059451 A1 | 7/2004 |
| WO | 2005010879 A2 | 2/2005 |
| WO | 2005055022 A1 | 6/2005 |
| WO | 2005093544 A1 | 10/2005 |

OTHER PUBLICATIONS

DRM Specification, Candidate Version 2.0—Jul. 16, 2004, Open Mobile Alliance, OMA-DRM-DRM-V2_0-20040716-C, 142 pages.*
Contentguard; "XrML 2.0 Technical Overview", XP002376310. www.contentguard.com/whitepapers/XrMLTechnicalOverviewV1.pdf.

* cited by examiner

*Primary Examiner* — James D Nigh

(57) ABSTRACT

The enforcement of the distribution of content information is carried out in a way similar to that wherein the content rights are enforced. This is accomplished by means of making the description of the domain policy and configuration a functional part of the license under which content information is made available to a user.

9 Claims, 3 Drawing Sheets

LICENSE SPECIFIC AUTHORIZED DOMAINS

FIELD OF THE INVENTION

The invention relates to a method of enabling to process content information at an electronic system. The invention further relates to a data processing system and to software for use in such a method.

BACKGROUND OF THE INVENTION

In recent years, the number of different types of content protection systems has been growing at a rapid pace. Some of these systems only protect the content against illegal copying. Other systems are prohibiting the user from getting access to the content. The first category is referred to as Copy Protection (CP) systems. CP systems have traditionally been the main focus for consumer electronics (CE) equipment. This type of content protection can typically be implemented in an inexpensive manner, and does not require bidirectional interaction with the content provider. Some examples are the Content Scrambling System (CSS), the protection system of DVD ROM discs and DTCP (a protection system for IEEE 1394 connections). The second category of systems, relating to prohibiting access, is known under several names. In the TV broadcast world, these systems are generally known as conditional access (CA) systems, whereas on the Internet they are generally known as digital rights management (DRM) systems.

A home network can be defined as a set of devices that are interconnected using a network technology (e.g., Ethernet, IEEE 1394, BlueTooth, 802.11b, 802.11g, etc.). Although network technology allows the different devices to communicate, this is not enough to enable devices to interoperate. For interoperability, devices need to be able to discover and address the functions present in the other devices in the network. This functionality is provided by home networking middleware. Examples of home networking middleware are Jini, HAVi, UPnP, and AVC.

The concept of authorized domains aims at finding a solution to both serve the interests of the content owners (who want their copyrights protected) and of the content consumers (who want unrestricted use of the content). The basic principle is to have a controlled network environment, also referred to as an authorized domain. Content can be used relatively freely, but only within the authorized domain. Typically, authorized domains are centered on the home environment or home networks. Of course, other scenarios are also possible. A user could, for example, take with him/her on a trip a portable device for rendering audio and/or video stored at the device, and also use it in his/her hotel room to access or download additional content stored at his/her personal audio/video system at home. Although the portable device is geographically outside the home network, it stays functionally a part of this user's authorized domain. In this way, an authorized domain is a system that allows access to content by devices belonging to the domain, but not by any other devices.

For a more extensive introduction to the use of an authorized domain, etc., see for example S. A. F. A. van den Heuvel, W. Jonker, F. L. A. J. Kamperman, P. J. Lenoir, Secure Content Management in authorized domains, Philips Research, The Netherlands, IBC 2002 conference publication, pages-474, held at 12-16 Sep. 2002.

Various proposals exist that implement the concept of authorized domains to some extent.

One type of known implementation is a device-based authorized domain. Examples of such systems are SmartRight (Thomson Multimedia), xCP, and Netdigital rights managementNetDRM (Matshushita). A further example of a device-based authorized domain is discussed in, e.g., WO 03/098931 of Philips Electronics, also published as US 20050210261, herein incorporated by reference.

A typical device-based authorized domain is formed by a specific set of devices and by content. Only a device of this specific set is allowed to access, use, etc., the content of that domain. There is no distinction between different users of the same specific set of devices in the same domain.

A drawback of device-based authorized domain systems is that they typically do not provide the flexibility that a user wants or needs, because the user is restricted to a particular and limited set of devices. In this way, the user is not allowed to exercise the rights, which the user has obtained, anytime and anywhere he/she chooses. For example, if a user is visiting a friend's house he/she cannot have access, from the friend's devices, to the user's legally purchased content. The devices at the friend's are typically not included in the particular and limited set of devices that together form the domain comprising this specific user's content.

Another type of known implementation is a person-based authorized domain. Here, the domain is based on persons (instead of on devices, as in device-based authorized domains discussed above) and on content. An example of such a system is described in, e.g., WO 04/038568, also published as US 20060021065, herein incorporated by reference. In the system described, content is tied to persons who have been grouped into a domain.

In a typical person-based authorized domain, access can be had to content bound to that authorized domain. However, only a specific and limited set of users is allowed the access. These users may employ any compliant device. Domain management in a person-based authorized domain is in general easier than in a device-based authorized domain.

However, person-based systems require person identification, which is not always convenient for, or preferred by, their users. Further, a visitor to the home of an authorized user may want to access the user's content. As he/she does not have a personal identifier for that domain, it is not possible for him/her to access the content. It is preferred that devices in the home belonging to the domain enable the visitor to access the content of that domain.

Therefore, there is a need for a hybrid authorized domain, which has aspects in common with a person-based domain as well as with a device-based domain. Such a hybrid domain intends to combine the advantages of both. A hybrid person-based and device-based authorized domain is proposed in WO 05/010879, filed in the U.S. Ser. No. 10/565,663 and incorporated herein by reference. In this document, an authorized domain is disclosed that combines two different approaches in order to define an authorized domain. The connecting part between the device-approach and the person-approach is a so-called Domain Identifier. The devices are preferably grouped together via a domain-devices certificate (DDC); the persons are preferably separately grouped via a domain-users certificate (DUC); and content is directly or indirectly linked to a person.

However, when content is imported from, e.g., a delivery digital rights management system and/or a CA system, into this authorized domain (an action typically performed via a device), it is not directly clear to which person the content has to be allocated. In other words, at the moment of import, the system needs additional information about the person with whom the content is to be linked.

Therefore, there is a need for a simple method of creating an authorized domain wherein the additional information required upon importing content is easily and/or directly obtainable. This is achieved with the authorized domain proposed in WO 05/093544, incorporated herein by reference. In this publication, a method of generating an authorized domain is proposed with following characteristics: a domain identifier is selected uniquely identifying the authorized domain; a user is bound to the domain identifier; a content item is bound to the user; and a device is bound to the user. Rather than binding each of the content items, each of the devices and each of the users to an authorized domain, only users are bound to an authorized domain, and content items and devices are bound in turn to users.

As discussed above, different authorized domains are distinguished by their domain configuration and policy. For example, the authorized domain can be defined as a set of, say, at most ten devices linked to a single domain identifier, which is linked to a maximum of, say, five user accounts to which an unlimited set of content is bound. In addition to the maximum number of devices and accounts, policies may include frequency limitations, allowing a limited number of configuration changes per unit of time, or proximity controls that restrict certain content or domain functions to certain locations.

SUMMARY OF THE INVENTION

In current systems, a clear distinction is being made between the content rights and the domain configuration and policy. This means that a DRM license does not include rights expressions that address the distribution of content within an authorized domain. In some cases a license includes a link to a manager (e.g., OMA DRM) that defines and handles a domain policy.

The inventors now propose a system wherein a description of (or the conditions of) the domain configuration and domain policy is a functional part of the license. The domain configuration conditions determine the allowed domain configuration, i.e., the potential structure of a domain. The conditions determine the conditions under which content or rights may be distributed within a certain domain. For example, a domain configuration may be based on License Proximity rules as to be discussed below. The domain policy determines a policy within the context of a domain configuration. It may be a set of variables or functions that effectively pose (numeric) limits to the size of the domain. For example, for a domain configuration based on License Proximity rules, a policy may indicate that at least 5 licenses must be proximate before a copy of a license or content may be made.

In order to appreciate the invention, consider the following problems that arise from not putting the domain policy and domain configuration conditions into the license.

A first problem is that in some systems the authorized domain policy is built into a specific technology. This implies that for authorized domains a single configuration is defined for a complete system. The argument is often that this provides the consumer with a single, integrated experience. However, the domain configuration turns out to be directly related to the business models of the content owners and content distributors. Different content types need different domain configurations and policies. Furthermore, the different domain configurations and domain policies are a means in the competition for attracting consumers. Standardization of these policies is therefore extremely difficult as it is related to finding a business model that suits all parties involved. These difficulties greatly hamper the standardization of DRM systems, thereby hampering their successful market introduction.

A second problem is that in some systems a service provider carries out domain management and (policy) enforcement. This creates long-term dependencies between customers and content providers. In these cases a link (a URL) to a specific (Internet) service is embedded into a license. The party that sells the content typically runs this service. This service maintains a large set of domains and enforces the accompanied policies. This service-approach circumvents the problems of having a single domain policy for the whole system. However, this approach introduces a long-term dependence between the customer and the service provider. This also leads to several drawbacks. A first drawback is that the customer is dependent on the continuing existence of the service provider to distribute, and on the long term, to render his/her content. A second drawback is that the service provider may gain some insight in part of the use (distribution) of content. From the perspective of the consumer this can be considered as a violation of privacy. As a third drawback, it creates a burden for a content distributor in that this distributor must set up a domain management infrastructure, and must guarantee that it will exist for a sufficiently long period of time. This type of domain management is not too interesting to a distributor who merely wants to sell content.

Therefore, the inventors propose that the enforcement of distribution of content (authorized domains) be carried out in a way similar to that wherein the content rights (play, burn, render, print, etc.) are enforced. The content provider defines the distribution rights (domain configuration and domain policy conditions) and sells content with these conditions. In a sense, content is purchased with a combination of content rights and distribution rights. The DRM clients at the consumers enforce both the content rights and the distribution rights.

Accordingly, the invention relates to a method of enabling, e.g., a user, to process content information at a data processing system of the user, e.g., CE equipment, a home network or an electronic device or another DRM client, where the content information comprises a license with a right to distribute within a domain. The step of enabling to process comprises exercising through the system control of, e.g., user-initiated, distribution of the content information via the system according to domain configuration and domain policy conditions being a functional part of the license (and in case of license communication or distribution are thus also being distributed as a functional part of the license). Preferably, the step of exercising of the control comprises providing a license with a right to distribute the content information, wherein the right is enforceable by the system. In an embodiment, the step of enabling to process further comprises exercising via the system control of conditional access to the content information through the system. For example, the content information is encrypted and the step of exercising of the control comprises providing with the license a key to decrypt the encrypted content information. In a further embodiment, the domain configuration and domain policy conditions are at least partly expressed in a dedicated machine-processable language describing the distribution rights. In a further embodiment, the step of providing of a license, mentioned above, comprises enabling to provide a further license with a further right to distribute the content information, the further right being enforceable by the system. Preferably, the further right is derived from the right first-mentioned.

The invention also relates to a data processing system for processing content information, and to software for installing on such a system as further specified in the appending claims.

BRIEF DESCRIPTION OF THE DRAWING

The invention is explained in further detail, by way of example and with reference to the accompanying drawing wherein.

Throughout the figures, same reference numerals indicate similar or corresponding features.

DETAILED EMBODIMENTS

Figure 1:
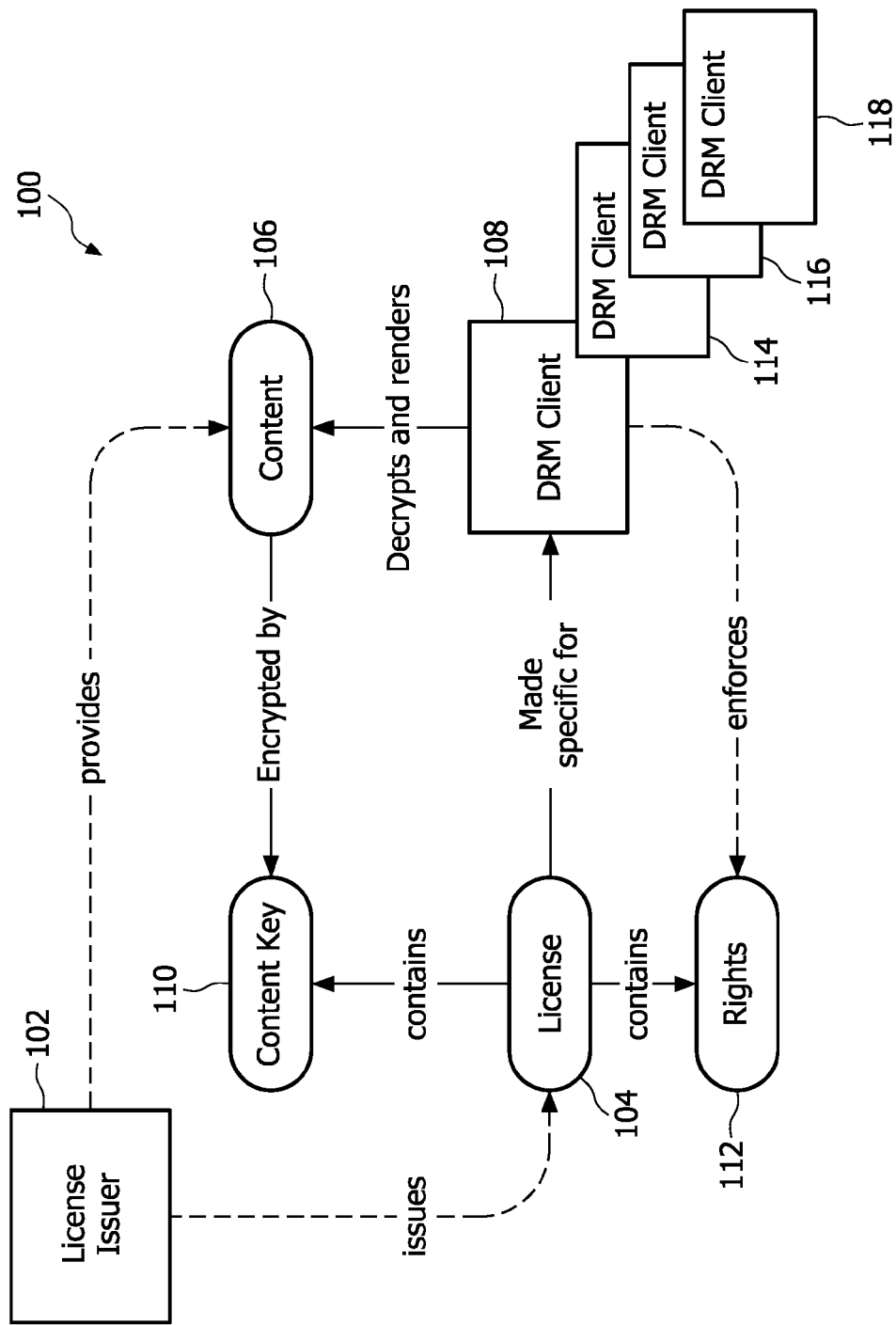
FIGS. 1 and 2 are function diagrams illustrating a system of the invention.

As discussed above, the invention aims, among other things, at providing a service so as to enable a user to process content information. The service exercises preferably combined control of both conditional access by the user to the content information, and of distribution of the content information by the user.

In order to enable a content provider to define distribution rights, a new or extended Rights Expression Language (REL) is needed. This REL contains the syntax and semantics to describe the distribution rights. Examples of such distribution rights are the following:

Device Count: indicating on how many different devices a copy of a license may exist Device Count Method: indicating a method on how the Device Count is to be managed or decreased. Examples are:

Master: only from one license copies can be made. The license can not be moved.

Movable master: only from one master license copies can be made. This license can be moved further, without invalidating previously made license copies.

Primary: where one (the first) instance of the license keeps track of the number of copies that are made from the master or from another copy.

Split: the Device Count is split into two (or more) counts, such that the sum of the two (or more) counts is equal to the Device Count. For example, a Device Count of five can be split into a Device Count of three for one license, and Device Count of two for the other license.

Decrease: the Device Count (if positive) is reduced by unity if (and before) a copy is made. If the Device Count is zero, no further copies may be made. This implies that at most $2^{(device\ count)}$ copies can be made.

Copy Proximity: indicating that two devices that want to exchange the license must be in spatial proximity with one another.

License Proximity: indicating that rendering is only allowed when a specific amount of licenses are proximate. This way proximity to devices in the 'neighborhood' is measured. When a certain amount of these proximate devices have a valid license for that piece of content, than license evaluates to 'true' and the content may be rendered. This forces content to be used in groups of devices that are proximate to each other, for example devices within a single home. A portable device used during travel (and not connected to other devices) would not be allowed to render such content.

Move allowed: indicating that a license can be moved from one device to another.

Include: referencing another license with domain constraints. Copying is allowed if both the criteria of the referenced license and the license at hand are fulfilled. State that comes with rules contained in the 'included' license is ignored. For example, when the 'included' license states that a copy is allowed to ten devices, then this license may be copied to ten devices irrespective of other licenses that have included the 'parent' license. The child licenses would not need any distribution rights as these are inherited from the parent license.

Extend: referencing another license with domain constraints. Copying is allowed if both the criteria of the referenced license and the license at hand are fulfilled. State that comes with rules contained in the 'extended' license is taken into account. For example, when the 'extended' license states that a copy is allowed to ten devices, then all the licenses that refer to the 'extended' must be distributed over the same set of (e.g., at most ten) devices. This mechanism allows bundling of content on a limited set of devices.

Copy Authentication: user authentication must occur before a copy can be made to a new device.

Render Authentication: user authentication must occur before the content can be rendered.

Authentication Timeout: limits the period of time during which a device authenticates a specific user for this license.

Copy Frequency: defines how many copies can be made per unit of time.

Move Frequency: defines how many times a license may be moved per unit of time.

Child Rights: describes the set of (distribution and usage) rights that copies of the license should get. Example usage of this right is to set time-outs on copies, or to make copies include or extend the current license.

Copy Quality Decrease: the content of the copy may only be rendered at reduced quality levels. This mimics the behavior of analog copies. Subsequent copies may or may not be allowed and if allowed, will show further detoriation.

The example rights described above already allow for many different domain policies. The description of these policies is somewhat different from the traditional policies and configurations. This is a consequence of the fact that the domains per license policy are described from the viewpoint of the license, whereas the more traditional domain configurations and policies are described with a global view of the system.

Also note that a dedicated language for the expression of the distribution rights can be implemented using XML or another suitable mark-up language.

The generic structure of the DRM system with explicit distribution rights is similar to existing DRM systems. The main difference is in the part played by the DRM clients. These clients now have an additional set of functions that enforce the distribution rights. These distribution rights are added to the set of conventional rights contained in a license. This is illustrated in FIG. 1.

FIG. 1 is a diagram illustrating the various concepts in a DRM system 100 of the invention. System 100 comprises a service provider 102 who issues a license 104 to a specific client 108. Service provider 102 also supplies encrypted content information 106 to specific client device 108. License 104 contains a content key 110 that enables client 108 to decrypt and render content information 106. License 104 also comprises explicit distribution rights 112 that specify the domain of usage of content 106 as supplied to client 108. Client 108 is operative to enforce distribution rights 112 in operational use of system 100. Client device 108 can handle most policy decisions locally. However, some policy decisions require a form of state management that needs the cooperation of device 108 and all other devices 114, 116, . . .

, 118 to which license 104 is copied. This is typically the case with counting devices (as described under "Device count" above) to which copies of the license (or the extended license) have been made available. Furthermore, some policy decisions require device interaction under condition of proximity.

When global (i.e., involving a plurality of devices) state management is necessary, a specific one of devices 108, 114, 116 and 118 may be elected as the owner of the state. This could be device 108 that received the first instance of license 104 from service provider 102. In the copies of license 104 the state owner, in this case device 108, is explicitly mentioned. DRM clients, e.g., devices 114-118 that need to access the global state are required to contact the designated state owner, i.e., device 108. An alternative approach is to add a protocol (e.g., peer-to-peer) that tries to synchronize the states of the different replicas of license 104 existing on devices 108 and 114-118. Such a protocol works well on a best-effort basis. This means that the states may be temporarily inconsistent between different DRM clients 108, 114-118, but this may be acceptable depending on the domain policies. An option is to embed both mechanisms (state ownership and synchronization protocol) in DRM clients 108 and 114-118, and add a policy choice option in the distribution rights language.

Instead of having DRM clients 108, 114-118 manage the state, the state can alternatively be managed by an online service, e.g., service 102 or another trusted party. This is the easier solution from a technical point of view, but this also re-introduces the dependence on an external service. However, this approach still allows different domain policies to co-exist within a single system. Furthermore, when the service fails a different service may take over the responsibility. In such a case the licenses include all the necessary policy information for the new service to set up the domain.

To securely control license distribution, a preferred way is to bind each individual license to a specific DRM client. This means that the license is encrypted, and can only be decrypted by the DRM client for which the license is intended. This prevents licenses from being copied to an unknown location, invisible to the set of devices that are already part of the license domain. This also prevents licenses from being inserted multiple times at different locations. An alternative approach is not to encrypt the licenses but to set up secure channels over which the licenses are distributed. The channel is only set up between trusted DRM clients, thereby preventing distribution of rights to unknown devices.

When licenses are copied the DRM client, which is the source of the copy, creates a new license with the adjusted rights and binds that new license to the other DRM client to which the copy is made. This implies that DRM clients can generate and alter copies of licenses. An alternative approach is sending the original license, and indicating in a separate data structure the state of the license. In both cases the DRM clients become issuers of a license themselves. This is something that is usually not part of a conventional DRM client.

Figure 2:
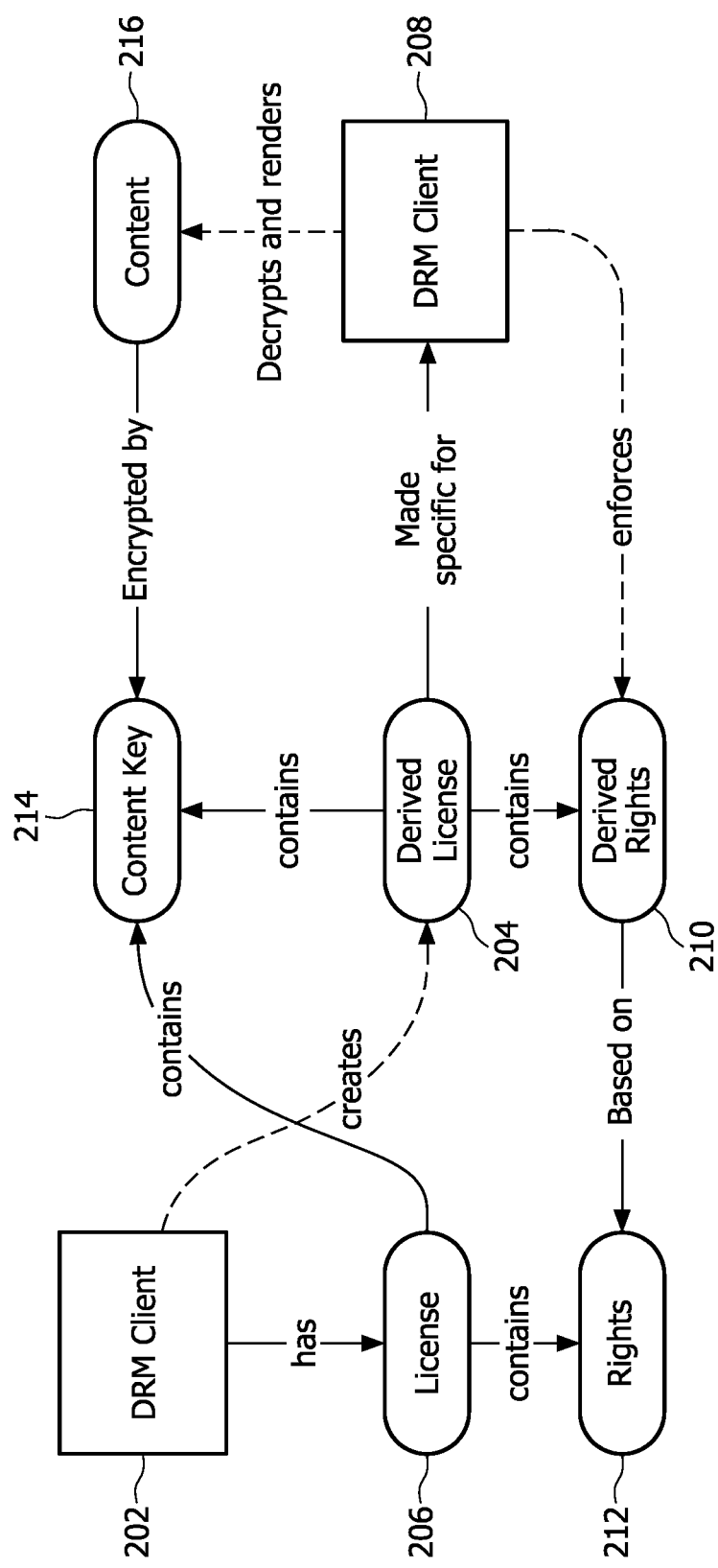

FIG. 2 shows a DRM client 202 creating a license 204 that is derived from another license 206 it has. Derived license 204 is to be used by another DRM client 208 and contains rights 210 that are adjusted according to, and based on, rights 212 specified in initial license 206. In this example, license 206 and derived license 204 both contain the same encryption key 214 in order for clients 202 and 208 to have access to content 216. Note that in an alternative scenario, derived license 204 may contain instead another key (not shown), different from the one contained in license 206. For example, derived license 204 contains a key that decrypts only a low-quality level of content 216, whereas the key contained in license 206 enables decryption of a high-quality level of content 216.

In an alternative scenario, for example based on the Coral architecture (see http://www.coral-interop.org), DRM client 202 can be replaced with a rights mediation service (not shown). The goal of this service is to issue licenses derived from a set of rights that have been issued by a license issuer (e.g., in the form of a rights token, which can be regarded as a license). The derived licenses are licenses in a DRM system, which may be different from the DRM system wherein the first license was issued. This derivation is highly policy driven. By putting the policy in the initial license it does not have to be standardized for the complete system.

Figure 3:
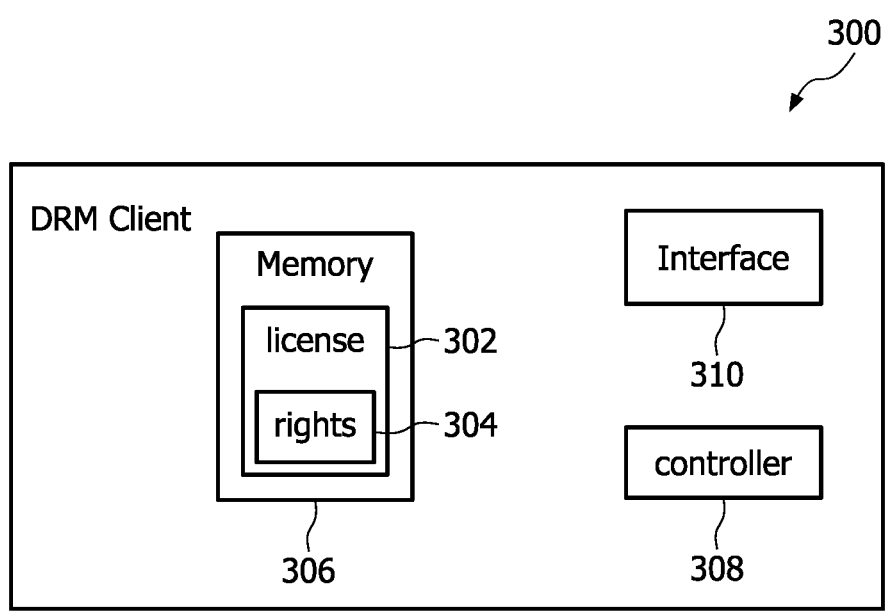
FIG. 3 is a block diagram illustrating a DRM client in the invention.

FIG. 3 is a block diagram of a DRM client 300 illustrating its functionalities within the context of the invention. Client 302 has received a license 302 comprising certain rights 304 that specify the domain of usage of content information to which license 302 pertains, as discussed above. The rights are installed at client 300, e.g., in a memory 306, as control code to enable control of the distribution, via client 300, of the content information. To this end, client 300 has a controller 308 that enforces these rights 304, as represented in the control code, in the interaction with other clients on the network (as in FIGS. 1 and 2, not further shown) via an interface 310.

This invention can be applied to future DRM systems, or such systems currently under development. It enables to standardize a domain model that may benefit of this invention as it circumvents the troublesome policy discussions. For example, in a service framework that mediates between different DRM systems, this approach can be used to describe the content exchange policies for the different content items, allowing multiple domain models to co-exist within the same technical framework. This enables to develop a specification that allows manufacturers to implement DRM so that it works across a range of devices from different manufacturers.

The invention claimed is:

1. A method of enabling use of content on a plurality of computing devices, the method comprising acts of:
    providing to a first of the plurality of computing devices a license defining a right to electronically distribute the content within a domain, the right to electronically distribute including a domain configuration defining domain structures that are allowed for distribution of the content and a domain policy defining conditions within the allowed domain structures for distribution of the content;
    the first computing device
        examining the license; and
        distributing the content according to the domain configuration and domain policy from the examined license.

2. The method of claim 1, wherein the act of distributing the content comprises an act of the plurality of computing devices enforcing the domain configuration.

3. The method of claim 2, further comprising an act of the plurality of computing devices in the domain configuration exercising control of conditional access to the content.

4. The method of claim 2, wherein the content is encrypted and the license further including a key to decrypt the encrypted content.

5. The method of claim 1, wherein the domain policy is at least partly expressed in a machine-processable language.

6. The method of claim 2, wherein the license comprises a further right to distribute the content, the method comprising enforcing the further right while performing the act of distributing the content.

7. The method of claim 6, further comprising an act of deriving the further rights from the right to electronically distribute.

8. A data processing system for processing content information, the system comprising:
- a device for providing a license with a right to distribute the content within a domain, the right to distribute including a domain configuration defining domain structures that are allowed for distribution of the content and a domain policy defining conditions within the allowed domain structures for distribution of the content;
- a plurality of computing devices formed in domains for examining the license and distributing the content according to the domain configuration and the domain policy conditions from the examined license.

9. A method of steps tangibly embodied on a non-transitory computer readable medium, when executed by a processor the method enabling use of content on a plurality of computing devices, the method comprising:
- providing to a first of the plurality of computing devices a license with a right to distribute the content within a domain, the right to distribute including a domain configuration defining domain structures that are allowed for distribution of the content and a domain policy defining conditions within the allowed domain structures for distribution of the content;
- the first computing device examining the license; and distributing the content according to the domain configuration and domain policy from the examined license.

* * * * *